United States Patent
Miremadi

(10) Patent No.: US 7,253,890 B2
(45) Date of Patent: Aug. 7, 2007

(54) DOOR OBSTACLE SENSOR

(76) Inventor: Reza Miremadi, 8886 Moorcroft Ave., West Hills, CA (US) 91304

( * ) Notice: Subject to any disclaimer, the term of this patent is extended or adjusted under 35 U.S.C. 154(b) by 159 days.

(21) Appl. No.: 10/741,143

(22) Filed: Dec. 19, 2003

(65) Prior Publication Data

US 2005/0133699 A1 Jun. 23, 2005

(51) Int. Cl.
*G01J 1/00* (2006.01)
*G01J 1/36* (2006.01)

(52) U.S. Cl. ...................................... 356/213; 356/218
(58) Field of Classification Search ..................... None
See application file for complete search history.

(56) References Cited

U.S. PATENT DOCUMENTS

| | | | | |
|---|---|---|---|---|
| 3,597,755 A | * | 8/1971 | Parkin | 340/555 |
| 3,644,917 A | * | 2/1972 | Perlman | 340/556 |
| 4,467,251 A | * | 8/1984 | Jonsson | 318/480 |
| 4,736,097 A | * | 4/1988 | Philipp | 250/221 |
| 5,508,511 A | * | 4/1996 | Zur et al. | 250/222.1 |

\* cited by examiner

*Primary Examiner*—Michael P. Stafira
(74) *Attorney, Agent, or Firm*—Kirschstein, et al.

(57) ABSTRACT

A door obstacle sensor in which an optical transmitter and a receiver are located on the same side of an entranceway, and a retroreflector is placed on the opposite side. A controller measures the time of flight of a light beam that is reflected from the retroreflective target. All future target distances are compared to the initial distance, and a decision is made as to an object being present in or absent from the entranceway.

11 Claims, 5 Drawing Sheets

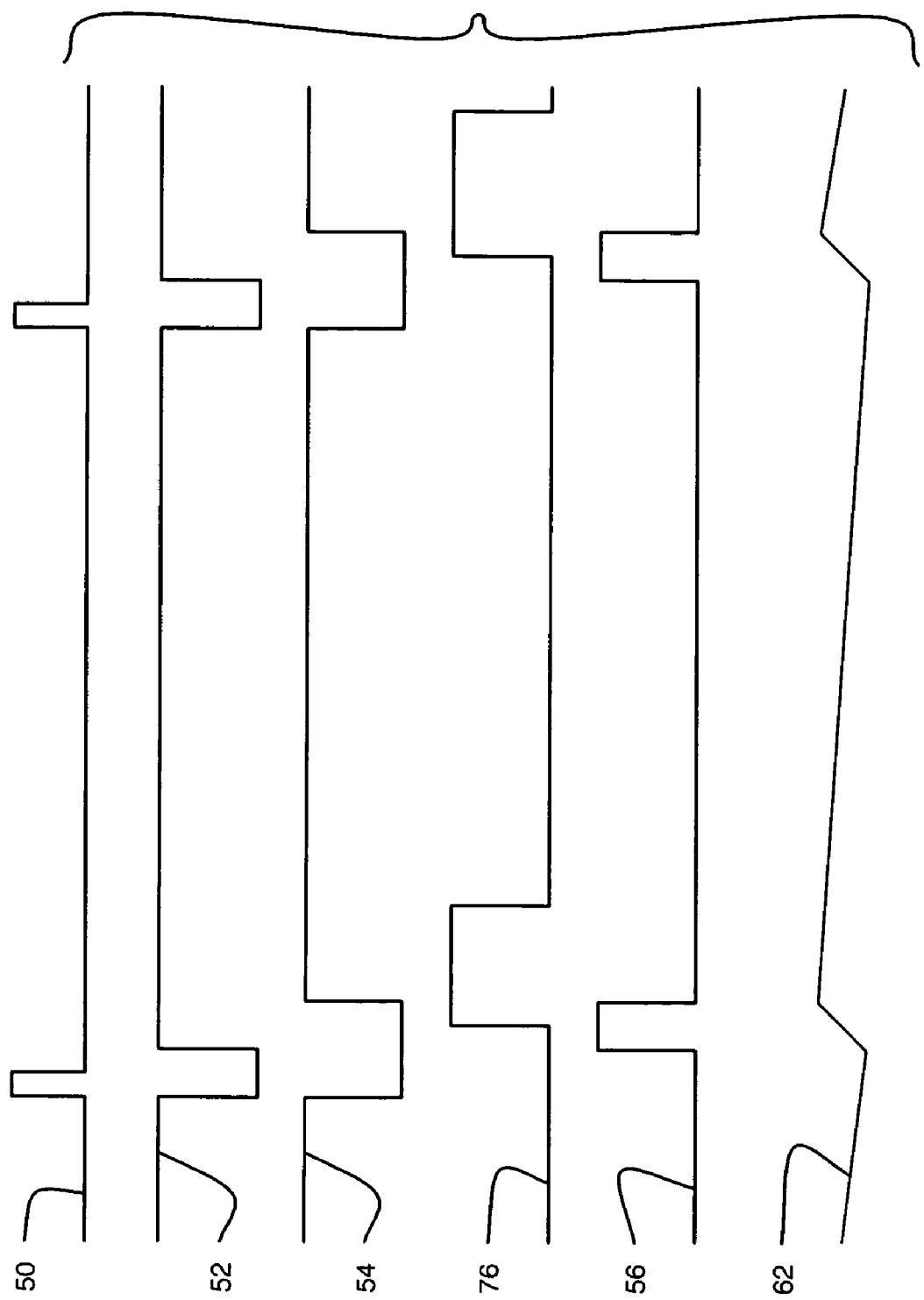

DOOR OBSTACLE SENSOR

BACKGROUND OF THE INVENTION

1. Field of the Invention

This invention generally relates to an arrangement for, and a method of, detecting the presence or absence of persons or things in an area, such as an entranceway, both outdoor and indoor, and, more particularly, to fail-safe obstruction detectors especially useful in systems for controlling garage doors, elevator doors and the like, and to security systems for controlling access to a secure area.

2. Description of the Related Art

An obstruction detector for an automatic garage or elevator door control system prevents personal injury and/or property damage to a person or thing caught in the closing door, as well as preventing damage to the door itself and the various drive components that close the door.

As shown in FIGS. 1-2, it has been proposed to use a light transmitter 1 powered by a controller 7 to transmit a light beam, along a direct path, across a door opening or entranceway for detection by a light receiver 2. Unobstructed receipt of the light beam indicates that the entranceway is free of the object 3. However, failure to receive the light beam indicates that the entranceway has an obstruction. This failure is electronically processed by the drive controller 7 to either stop or reverse a closing door. Analogously, it is known in security systems to transmit a light beam across a window or security zone. Interruption of the beam triggers an alarm, thereby summoning law enforcement personnel.

As shown in FIGS. 3-4, it has also been proposed to use the light transmitter 1 powered by the controller 7 to transmit the light beam across a door opening for reflection by a retroreflector 4 back toward the receiver 2 along a folded path. Receipt of the light beam at a certain power level indicates the absence of an obstruction, whereas receipt of the light beam at a different power level indicates the presence of the obstruction. One limitation of such folded path systems is that when an obstruction 5 is relatively near the receiver 2, the power level reflected by the obstruction 5 can be the same as the power level reflected by the retroreflector 4. The system can be fooled into thinking that no obstruction is present. To alleviate this problem, the art has employed a polarizer 6 for differentiating between reflections by the obstruction and the retroreflector. However, even a polarizer can be tricked by a diffused reflective object at close range.

Other prior patents of which I am aware include U.S. Pat. No. 5,473,461 and U.S. Pat. No. 5,508,511, in which I am a named inventor.

SUMMARY OF THE INVENTION

Objects of the Invention

It is a general object of this invention to advance the state of the art of object detecting arrangements.

Another object of this invention is to provide an arrangement that reliably detects objects, such as persons and/or things, in an area, such as an entranceway.

Yet another object of this invention is to provide an obstruction detector arrangement particularly well suited for use in automatic door control systems, such as garage doors and elevator doors.

FEATURES OF THE INVENTION

In keeping with the above objects and others which will become apparent hereinafter, one feature of the present invention resides, briefly stated, in an arrangement for, and a method of, detecting an object in a door entranceway bounded by upright walls. The invention comprises a transmitter supported by one of the walls for transmitting a light beam across the entranceway toward the other of the walls; a retroreflector supported by the other of the walls for reflecting the light beam across the entranceway toward the one of the walls; and a receiver supported by the one of the walls for receiving the light beam reflected by the retroreflector when the object is absent from the entranceway, and for receiving light reflected by the object when the object is present in the entranceway.

The invention further comprises a controller having a reference arrival time of the light beam at the receiver when the object is absent from the entranceway, and for measuring an obstacle arrival time of the light at the receiver when the object is present in the entranceway, and for generating a control signal indicative of object presence in the entranceway when the measured obstacle arrival time is less than the reference arrival time by a given margin, or when the reflected light has an energy level at the receiver which is below a given reference energy level.

Thus, in accordance with this invention, the transmitter, the receiver and the controller are all mounted at one side of the entranceway, while the retroreflector, which does not require electrical power or wiring, is mounted at the opposite side of the entranceway. The measurement of arrival time of light and the processing of differences in arrival times, within predefined safety margins, prevents false triggering on obstacles at close range.

To achieve precise measurement and processing, the arrangement includes a light emitting diode (LED); means for pulsing the LED with electrical transmit pulses having a predetermined amplitude to direct outgoing light transmissions to a target, i.e., the object or retroreflector, for reflection therefrom; a photodiode having a field of view in which the target is situated, and operative for detecting incoming light reflections reflected from the target and for generating electrical receive pulses of variable amplitude; and means for conditioning the receive pulses to have an amplitude matching the predetermined amplitude of the transmit pulses to generate conditioned received pulses.

In accordance with this feature of the invention, the system includes a first comparator having a first input to which the transmit pulses are conducted, a second input to which a reference voltage is connected, and a first comparator output; a second comparator having a first input to which the conditioned receive pulses are conducted, a second input to which the reference voltage is connected, and a second comparator output; a logic circuit connected to the outputs of the comparators for determining a difference in arrival times of the transmit pulses and the conditioned receive pulses at the first inputs of the comparators; and a processor for determining a distance to the target as a function of the difference in said arrival times.

Preferably, the conditioning means includes a gating switch for synchronizing the conditioned receive pulses with the transmit pulses, a peak detector for detecting voltages of the conditioned receive pulses, an integrator for integrating the peak voltages, and an automatic gain controller for controlling the amplitude of the integrated peak voltage. It is also preferred when the processor generates a reset signal for resetting the comparators. Still another preference is the use of an isothermal package for housing the arrangement.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 8 is a set of waveforms generated in the circuit of FIG. 7.

DETAILED DESCRIPTION OF THE PREFERRED EMBODIMENTS

Figure 1:
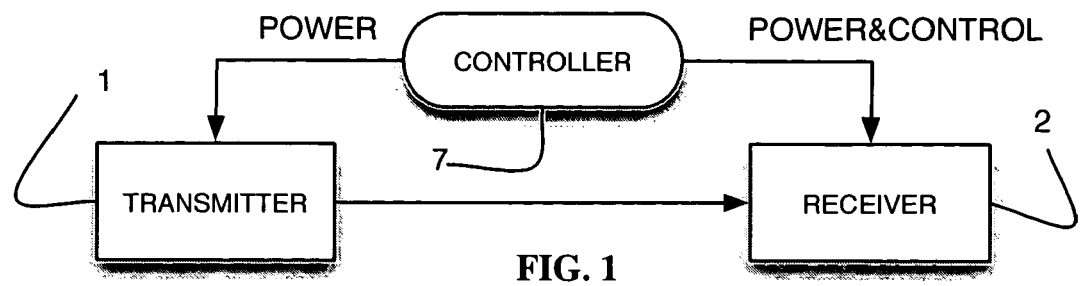
FIG. 1 is a schematic block diagram of one embodiment of a system in accordance with the prior art for obstacle detection.
Figure 2:
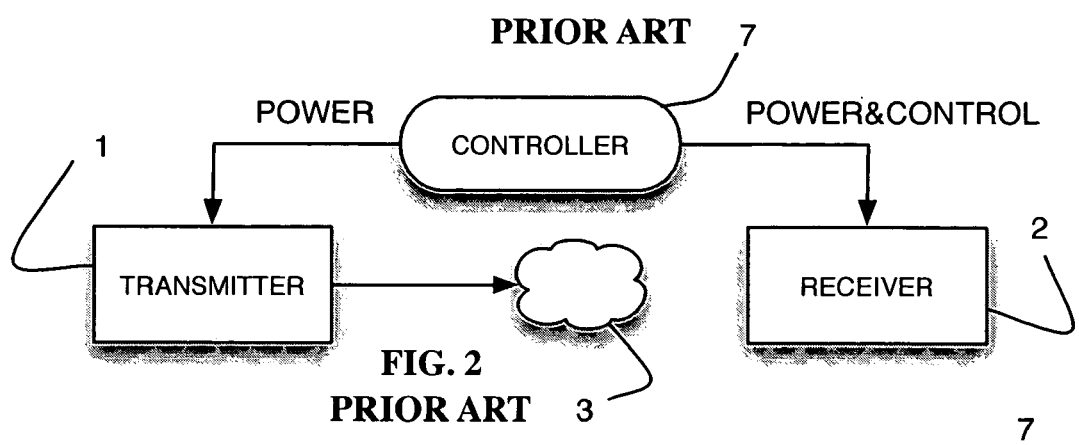
FIG. 2 is a diagram of FIG. 1 when an obstacle has been detected.
Figure 3:
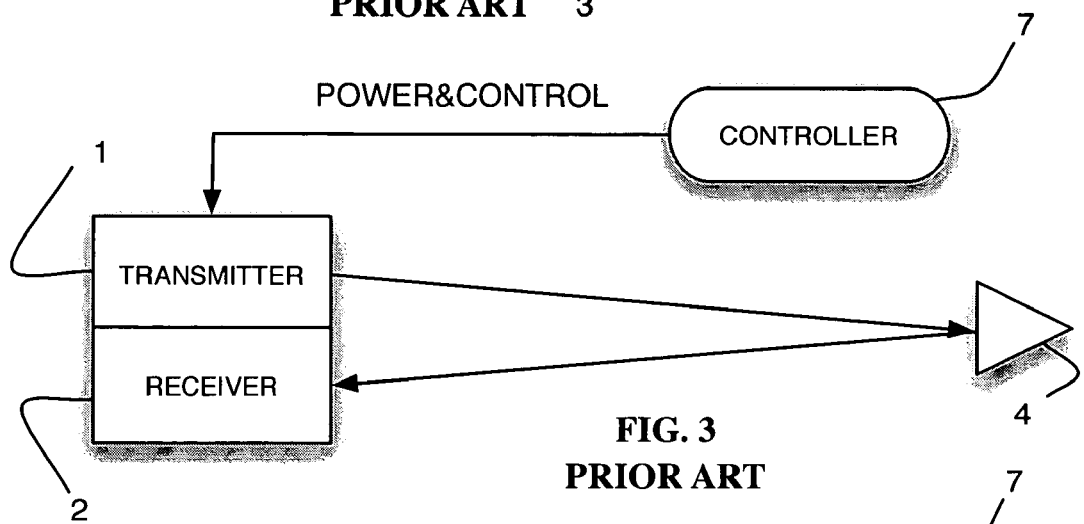
FIG. 3 is a view analogous to FIG. 1 of another embodiment of a system in accordance with the prior art for obstacle detection.
Figure 4:
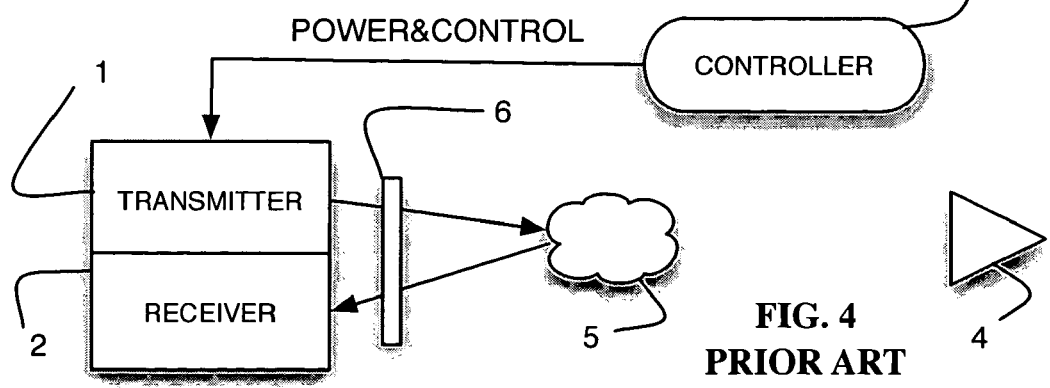
FIG. 4 is a diagram of FIG. 3 during obstacle detection.
Figure 5:
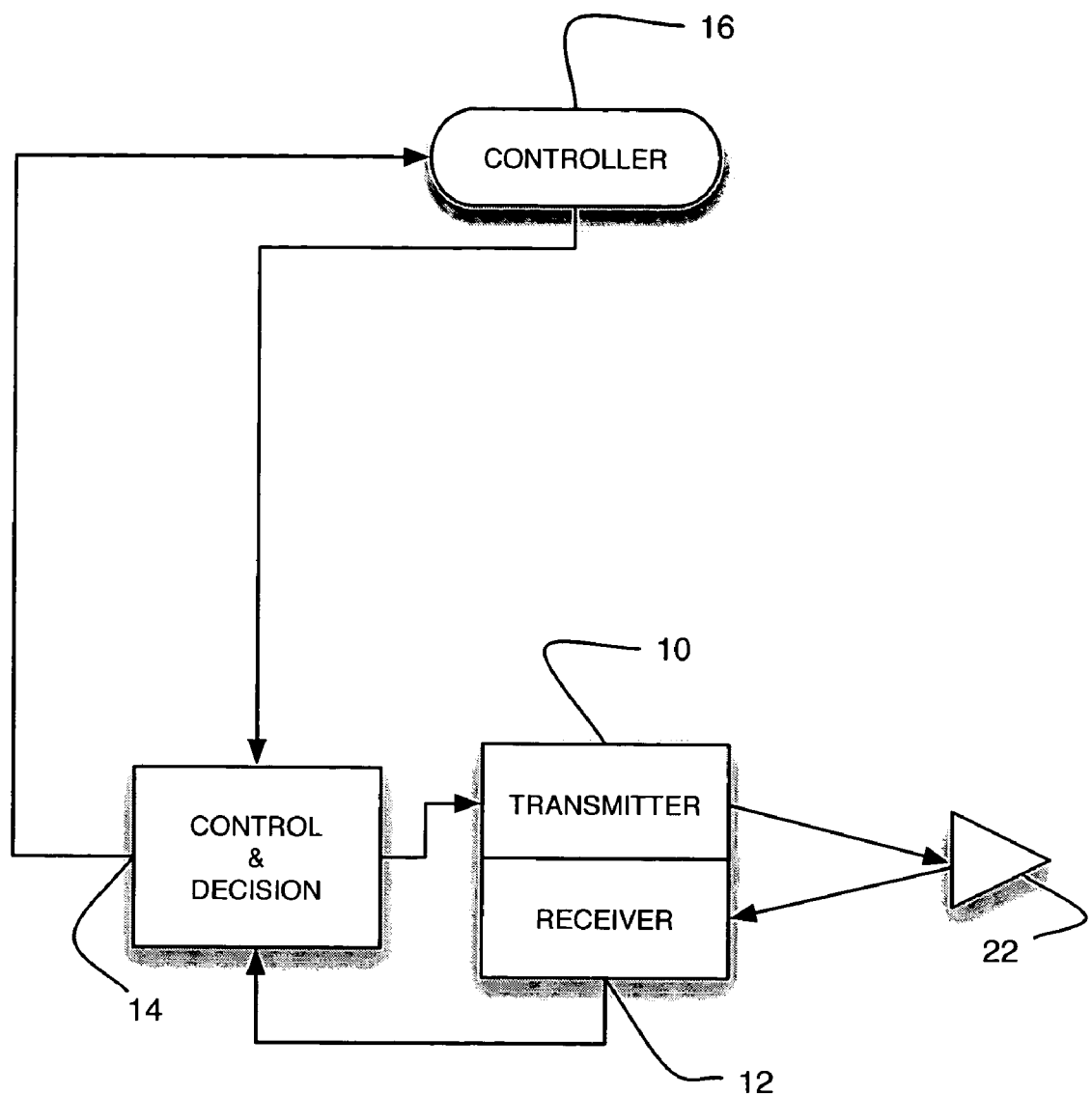
FIG. 5 is a schematic block diagram of an obstacle detector system in accordance with the present invention.
Figure 6:
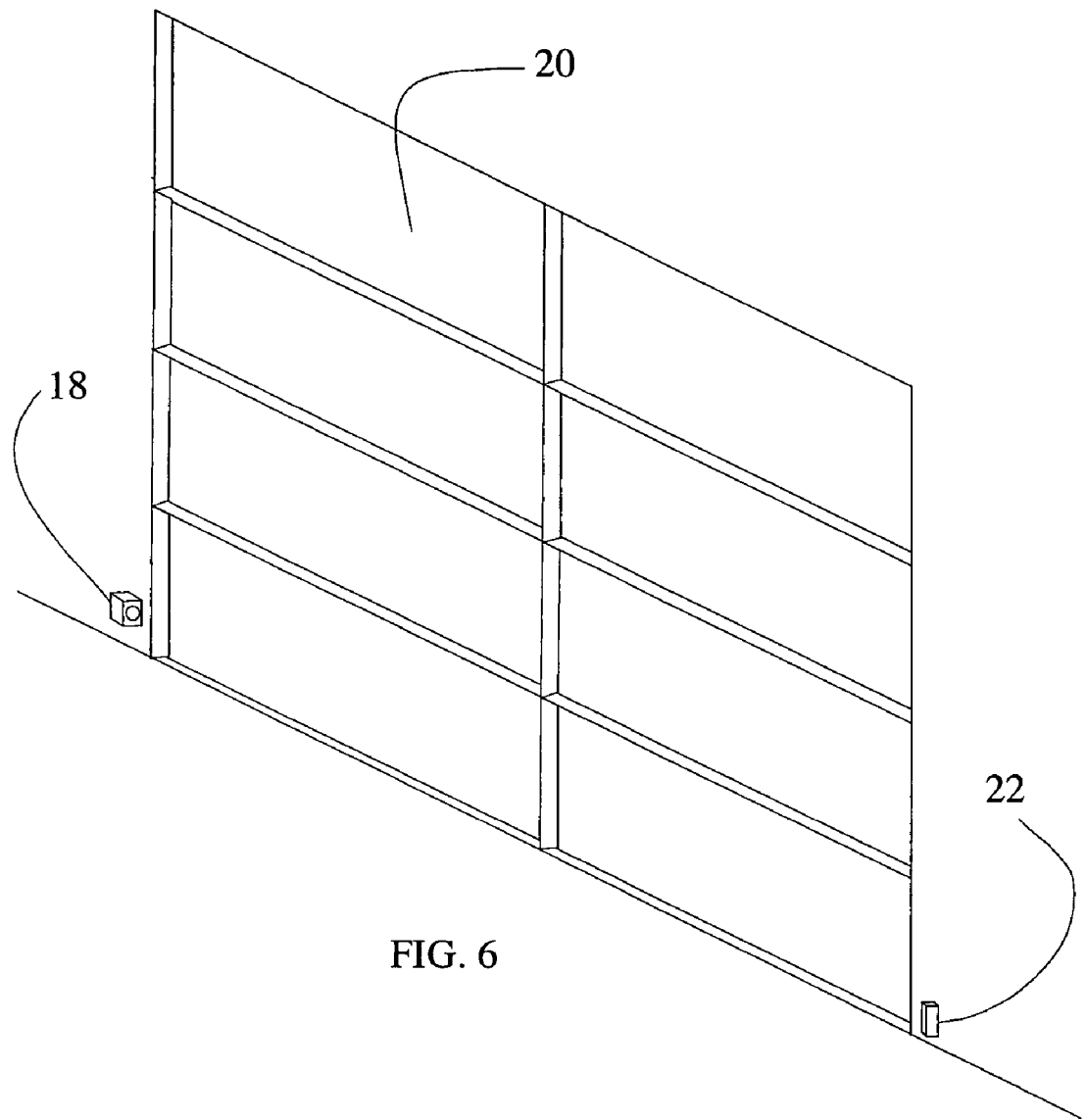
FIG. 6 is a perspective view of the system of FIG. 5 in a garage door installation.

Referring now to FIG. 5 of the drawings, reference numeral 10 generally identifies a transmitter positioned adjacent a receiver 12, and both connected to an electrical circuit including a control and decision section 14 which, in turn, is connected to a controller 16. The transmitter 10, receiver 12, and control circuitry 14 are all mounted, in a preferred embodiment, in a housing 18 (see FIG. 6) at one side wall of an entranceway, access to which is controlled by a controller 16 that moves a garage door 20. A retroreflector 22 is mounted at the opposite side wall of the entranceway. The term "wall" as used herein is intended to cover any form of support, including a fence or stakes on either side of a driveway.

Figure 7:
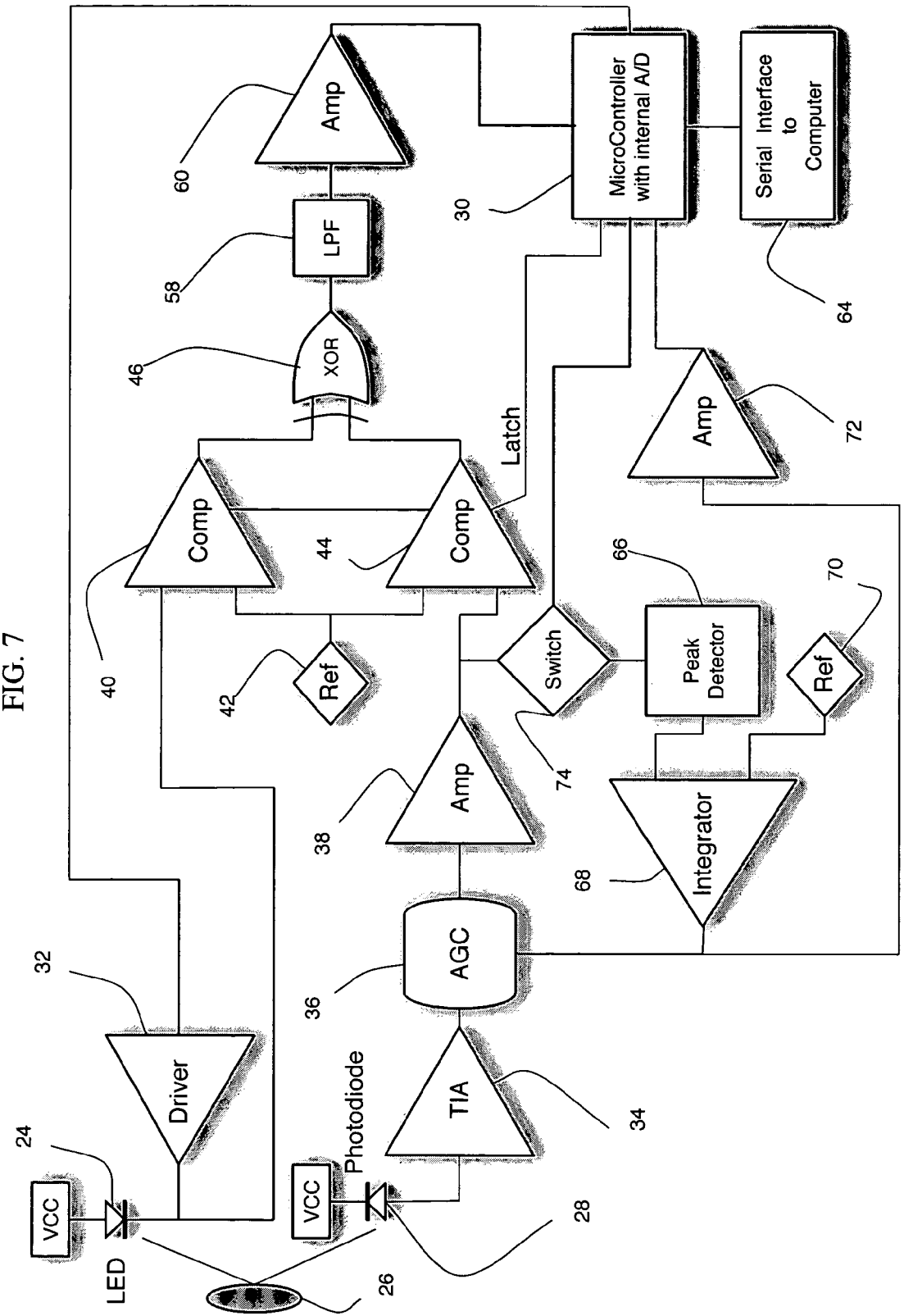
FIG. 7 is a schematic block diagram of a circuit used in the system of FIG. 5.

As shown in FIG. 7, reference numeral 24 identifies a light emitting diode, preferably at a frequency of 850 nm, for emitting light to a target 26 for reflection therefrom. A photodiode 28 has a field of view and detects the reflected light and generates electrical analog signals for processing, as described below.

A microcontroller 30 generates drive pulses that are conducted to a driver 32 and pulse the diode 24 with electrical transmit pulses having a predetermined amplitude at a fixed repetition rate. The driver 32 is preferably an npn transistor with a grounded emitter resistor.

The analog signals generated by the photodiode 28 are receive pulses amplified by a transimpedance amplifier (TIA) 34 which, in the preferred embodiment, has a bandwidth of 40 MHz. The amplified signals are conducted to an automatic gain controller (AGC) 36 and an amplifier 38 which match the variable amplitudes of the receive pulses to the predetermined amplitudes of the transmit pulses. The AGC 36 is a PIN diode attenuator with a bandwidth of 1 GHz in order to pass the receive pulses without any change in the rising edges of the pulses. Amplifier 38 has a bandwidth of 40 MHz.

The transmit pulses from the driver 32 are conducted to one input of a comparator 40, whose other input is connected to a fixed reference voltage level 42 (about 0.1 v). The receive pulses from the amplifier 38 are conducted to one input of a comparator 44, whose other input is connected to the same reference level 42. The comparators are each latched and have respective outputs connected to the dual inputs of an exclusive-OR (XOR) gate 46. Just prior to the receipt of the transmit pulses, the controller 30 resets the latch on the comparators 40, 44 via a pulse on waveform 50 (see FIG. 8). This resets the output of the comparator 40 to a low state (see waveform 52 in FIG. 8), and the output of the comparator 44 to a low state (see waveform 54 in FIG. 8).

The output of the gate 46 is waveform 56 which captures the difference in the arrival time of the transmit and receive pulses. The gate output is then passed through low pass filter (LPF) 58 and amplifier 60 and conducted to the controller 30. Amplifier 60 adjusts for any offsets created by the fixed delay in the path of the receive pulses. The signal fed to the controller is a DC voltage with some ripple as shown by waveform 62. The controller 30 converts the signal to a digital value which represents the distance from the system to the target. The signal is sent away from the system by a serial interface port 64.

The disclosed system is of special benefit in short range distance measurement on the order of a few feet. Since light travels at one foot per nanosecond, such short range measurements have been difficult to make because of the sub-nanosecond resolution and because the reflected receive pulses from the target have a variable amplitude which depends on target distance. The amplitude variation can cause an error which is an order of magnitude greater than the actual distance to be measured. To eliminate this effect, the receive pulses of variable amplitude are conducted to a peak detector 66 and to one input of an integrator 68, whose other input is connected to a fixed voltage reference level 70. The output of the integrator is fed to the AGC 36, as well as to an amplifier 72 and to the controller 30, as an indication of the amount of reflected light which is coming back from the target. Another analog-to-digital conversion occurs inside the controller to digitize the gain and reflected energy data.

Since the transmit and receive pulses being compared at the inputs of comparators 40, 44 have the same amplitude and shape, the difference in the arrival times of these pulses is accurately determined. The time delay through the photodiode 28, TIA 34, AGC 36 and amplifier 38 is compensated for by amplifier 60. Preferably, the system is mounted inside an isothermal package to minimize the variation of this time delay with temperature. The delay introduced by driver 32 is corrected for by taking the pulse from the emitter of the output driver transistor.

To further reduce noise and signal interference, the output of the amplifier 38 is gated by a switch 74 controlled by the controller 30. Waveform 76 in FIG. 8 is the gating signal which is synchronized to the transmit pulses. Only correlated transmit and receive pulses are considered in the AGC loop.

The diode 24 and photodiode 28 are physically placed next to each other. Preferably, the photodiode 28 is electro-magnetically shielded, together with the TIA 34, by being mounted in a copper housing.

For further long term stability, a temperature stabilization system comprising a heater, temperature sensor and a closed loop feedback system serves to maintain the temperature of the entire system at a few degrees above the highest expected operating ambient temperature. Any drift caused by component temperature variation is minimized by keeping all the components at the same temperature. The system is capable of distance resolutions of better than 0.1 inches, which is very accurate for garage doors of 8 or 16 feet in width.

In a preferred embodiment, upon initial installation of the system, the system is calibrated by transmitting a pulsed signal to the retroreflector and measuring the reference arrival time at the receiver. This reference time is then stored for future reference. All subsequent measured arrival times are then compared to this reference time. If a subsequent arrival time is less than the reference time, then an obstacle is in the entranceway. A margin of error is included in the processing to compensate for temperature and component variations, as well as for dust and other contaminants.

It is unnecessary to store the initial calibration reading of the reference time. A system can be preprogrammed with a reference time value to resolve the arrival time without any previous calibration. Also, the system can be preprogrammed to calibrate itself periodically, for example, daily or monthly.

This invention also contemplates generating the control signal when the object acts like a black body and absorbs the transmitted light beam, or when the object, particularly at far range from the receiver, reflects or scatters incident light away from the receiver, or returns the incident light to the receiver at a low level below a predetermined threshold level.

It will be understood that each of the elements described above, or two or more together, also may find a useful application in other types of constructions differing from the types described above.

While the invention has been illustrated and described as embodied in an obstacle sensor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for detecting an object in a door entranceway bounded by upright walls, comprising:
   a) a transmitter supported by one of the walls for transmitting a light beam across the entranceway toward the other of the walls;
   b) a reflector supported by the other of the walls for reflecting the light beam across the entranceway toward the one of the walls;
   c) a receiver supported by the one of the walls for receiving the light beam reflected by the reflector when the object is absent from the entranceway, and for receiving light reflected by the object when the object is present in the entranceway; and
   d) a controller having a memory which stores a reference arrival time of the light beam at the receiver when the object is absent from the entranceway, and for measuring an obstacle arrival time of the light at the receiver when the object is present in the entranceway, and for generating a control signal indicative of object presence in the entranceway when the measured obstacle arrival time is less than the reference arrival time by a given margin,
   wherein the reference arrival time corresponds to the time for the light beam to be transmitted by the transmitter across the entranceway and received by the receiver when the object is absent from the entranceway, and
   wherein the obstacle arrival time corresponds to the time for the light beam to be transmitted by the transmitter and received by the receiver when the object is present in the entranceway.

2. The arrangement of claim 1, wherein the transmitter and the receiver are mounted in a common housing, and wherein the reflector is a retroreflector.

3. The arrangement of claim 1, wherein the transmitter includes a light emitting diode (LED); and means for pulsing the LED with electrical transmit pulses having a predetermined amplitude to direct outgoing light transmissions to a target for reflection therefrom.

4. The arrangement of claim 3, wherein the receiver includes a photodiode having a field of view in which the target is situated, and operative for detecting incoming light reflections reflected from the target and for generating electrical receive pulses of variable amplitude.

5. The arrangement of claim 4, wherein the controller includes means for conditioning the receive pulses to have an amplitude matching the predetermined amplitude of the transmit pulses to generate conditioned received pulses; a first comparator having a first input to which the transmit pulses are conducted, a second input to which a reference voltage is connected, and a first comparator output; a second comparator having a first input to which the conditioned receive pulses are conducted, a second input to which the reference voltage is connected, and a second comparator output; a logic circuit connected to the outputs of the comparators for determining a difference in arrival times of the transmit pulses and the conditioned receive pulses at the first inputs of the comparators; and a processor for determining a distance to the target as a function of the difference in said arrival times.

6. The arrangement of claim 5, wherein the conditioning means includes a gating switch for synchronizing the conditioned receive pulses with the transmit pulses, a peak detector for detecting peak voltages of the conditioned receive pulses, an integrator for integrating the peak voltages, and an automatic gain controller for controlling the amplitude of the integrated peak voltage.

7. The arrangement of claim 6, wherein the processor generates a reset signal for resetting the comparators.

8. The arrangement of claim 1, wherein the controller also generates the control signal when the light reflected by the object has an energy level at the receiver below a given reference energy level.

9. A method of detecting an object in a door entranceway bounded by upright walls, comprising the steps of:
   a) supporting a transmitter by one of the walls for transmitting a light beam across the entranceway toward the other of the walls;

b) supporting a reflector by the other of the walls for reflecting the light beam across the entranceway toward the one of the walls;

c) supporting a receiver by the one of the walls for receiving the light beam reflected by the reflector when the object is absent from the entranceway, and receiving light reflected by the object when the object is present in the entranceway; and d) establishing a reference arrival time of the light beam at the receiver when the object is absent from the entranceway, and measuring an obstacle arrival time of the light at the receiver when the object is present in the entranceway, and generating a control signal indicative of object presence in the entranceway when the measured obstacle arrival time is less than the reference arrival time by a given margin, wherein the reference arrival time corresponds to the time for the light beam to be transmitted by the transmitter and received by the receiver when the object is absent from the entranceway, and wherein the obstacle arrival time corresponds to the time for the light beam to be transmitted by the transmitter and received by the receiver when the object is present in the entranceway.

10. The method of claim 9, and mounting the transmitter and the receiver in a common housing.

11. The method of claim 9, and generating the control signal when the light reflected by the object has an energy level at the receiver below a given reference energy level.

* * * * *